(12) United States Patent
Lemonnier et al.

(10) Patent No.: US 10,756,457 B2
(45) Date of Patent: Aug. 25, 2020

(54) METHOD FOR MANUFACTURING AN ASSEMBLED MULTICORE CABLE, AND ASSEMBLED MULTICORE CABLE

(71) Applicant: IVRY INTERCONNECT SERVICES, Pantin (FR)

(72) Inventors: Bruno Lemonnier, Flins-sur-Seine (FR); Michaël Poignand, Ivry-la-Bataille (FR)

(73) Assignee: IVRY INTERCONNECT SERVICES, Pantin (FR)

( * ) Notice: Subject to any disclaimer, the term of this patent is extended or adjusted under 35 U.S.C. 154(b) by 0 days.

(21) Appl. No.: 16/490,885

(22) PCT Filed: Feb. 26, 2018

(86) PCT No.: PCT/EP2018/054635
§ 371 (c)(1),
(2) Date: Sep. 3, 2019

(87) PCT Pub. No.: WO2018/162265
PCT Pub. Date: Sep. 13, 2018

(65) Prior Publication Data
US 2020/0014134 A1 Jan. 9, 2020

(30) Foreign Application Priority Data
Mar. 6, 2017 (FR) ..................... 17 51798

(51) Int. Cl.
*H01R 9/05* (2006.01)
*H01R 4/28* (2006.01)
(Continued)

(52) U.S. Cl.
CPC ............. *H01R 9/0524* (2013.01); *H01R 4/28* (2013.01); *H01R 9/11* (2013.01); *H01R 9/03* (2013.01);
(Continued)

(58) Field of Classification Search
CPC ................................. H01R 9/032; H01R 13/6592; H01R 2107/00; H01R 9/0524; H01R 13/405; H01R 9/03
(Continued)

(56) References Cited

U.S. PATENT DOCUMENTS 4,090,767 A 5/1978 Tregoning
8,262,408 B1 * 9/2012 Kelly ................... H01R 9/0524
439/578

(Continued)

*Primary Examiner* — Abdullah A Riyami
*Assistant Examiner* — Justin M Kratt
(74) *Attorney, Agent, or Firm* — Steven M. Greenberg, Esq.; Shutts & Bowen LLP

(57) ABSTRACT

The invention proposes a method for manufacturing an assembly (10) consisting of a connector (12) and a multicore cable (14) that comprises a shielding braid (18) that surrounds the conductors, and an outer sheath (20), said connector 12 comprising a conductive rear portion to which the braid (18) is joined, said method consisting of jointing the conductors to the connector (12); folding back a portion of the braid (18); moulding a first material around the conductors; unfolding the shielding braid over the region moulded with the first material to bring the braid into electrical contact with the connector (12); clamping the braid around the connector, with a collar (24); moulding a second material (30) to constitute an outer envelope (32) of the assembly (10) that surrounds at least the shielding braid (18) from its front end (19) to a front portion (21) of the outer sheath (20) of the multicore cable surrounding the shielding braid (18).

15 Claims, 2 Drawing Sheets

(51) Int. Cl.
*H01R 9/11* (2006.01)
*H01R 9/03* (2006.01)
*H01R 13/405* (2006.01)
*H01R 107/00* (2006.01)
*H01R 13/6592* (2011.01)

(52) U.S. Cl.
CPC ........ *H01R 13/405* (2013.01); *H01R 13/6592* (2013.01); *H01R 2107/00* (2013.01)

(58) Field of Classification Search
USPC .............................. 439/98, 579, 580, 607.41
See application file for complete search history.

(56) References Cited

U.S. PATENT DOCUMENTS

2005/0193556 A1* 9/2005 Ikeda ................... H02G 3/0487
29/868
2013/0143424 A1 6/2013 Nguyen et al.

* cited by examiner

METHOD FOR MANUFACTURING AN ASSEMBLED MULTICORE CABLE, AND ASSEMBLED MULTICORE CABLE

CROSS-REFERENCE TO RELATED APPLICATIONS

This application is a § 371 national phase entry of International Application No. PCT/EP2018/054635, filed Feb. 26, 2018, which claims priority to French Patent Application No. 1751798, filed Mar. 6, 2017.

TECHNICAL FIELD OF THE INVENTION

The invention relates to a method for manufacturing an assembly commonly called "assembled cable".

The invention also relates to an assembled cable.

TECHNICAL BACKGROUND OF THE INVENTION

The invention relates more particularly to a method for manufacturing assemblies, each of which comprises at least one multicore cable and a connector, which are also called assembled cables.

Assemblies of this type are notably used in the defence, aeronautical or medical equipment industry.

An assembly mainly consists of a set of components, including a connector that provides an interface with a complementary connector and a multicore cable enabling the transmission of signals and/or electric currents, for example for communication, data exchange and/or electric power supply.

A multicore cable may be an electric cable, comprising only electrical conductors (for example in the form of electrical wires), or else a so-called "hybrid" cable comprising at least one electrical conductor and at least one optical conductor (for example in the form of an optical fibre).

An associated or complementary connector may be an electrical connector for an electric multicore cable, or a hybrid connector for a hybrid multicore cable.

For a strong, reliable joint, an assembled cable also comprises other components, and notably a rear connector, which is screwed on the rear portion of the connector to which the various conductors of the multicore cable are connected.

This connector notably makes it possible to ensure electrical continuity between metallic peripheral braid shielding the multicore cable—also called "earthing", and thus electrical continuity of earthing with another assembled cable or electrical and/or electronic equipment. Such an arrangement is known for example from document US-A-2005/193556.

The mechanical joint between the multicore cable and the connector—ensuring tensile strength of the joint between the multicore cable and the connector—may be provided by an external heat-shrinkable cap.

A heat-shrinkable cap of this kind can also guarantee hermeticity of the joint between the multicore cable and the connector in addition by making use of a kit for a two-component adhesive, to guarantee hermeticity of the heat-shrinkable cap, during production and execution of this joint.

For a whole range of applications, notably corresponding to the special environments mentioned above, the connectors used comply with the "MIL" or "MIL-SPEC" standards. We may mention, as non-limiting examples, the connectors belonging to the categories MIL-C-3899 series I&II and III&IV, MIL-C-26482, or MIL-C-5015.

Thus, for a given connector corresponding to a MIL standard, production of a connector-multicore cable basic assembly requires collecting together various compatible components or elements, then assembling them by carrying out a set of manual operations, none of which can be automated.

Selection of the components to be assembled is a complex operation, as too are the operations of assembly and manufacture.

Each assembly of this type is thus produced by selecting components from five catalogues corresponding to:

the connector (for which there are at least three manufacturers, four MIL categories, nine sizes, three coverings and two shapes);

the multicore cable, which is defined by the number and the diameter of the various conductors;

the joint, which must be compatible with the connector and with the multicore cable, depending notably on its outside diameter and the type of shielding braid;

the heat-shrinkable cap, which must be compatible with the connector and the multicore cable and for which there are at least two manufacturers, six categories, six sizes and eight different materials;

and finally the two-component adhesive, which must be compatible with the material of the outer sheath protecting the multicore cable, for which there are two different materials.

Besides this large number of possible combinations (more than twenty thousand combinations for four different connectors), it is very difficult, for the assembler and manufacturer of the assembled cable, to guarantee constant, accurate shape and dimensions, with the risk that this leads to defects of aesthetic and/or dimensional compliance.

The invention aims to propose a novel method of manufacture and a novel assembly, which overcome the main drawbacks that have just been mentioned.

BRIEF SUMMARY OF THE INVENTION

The invention proposes a method for manufacturing an assembly consisting of a connector and a multicore cable that comprises:

a multicore cable comprising conductors including at least one electrical conductor, peripheral metallic shielding braid, which surrounds the conductors, and an outer protective sheath;

a connector, to which the front ends of the conductors of the multicore cable are joined, and which comprises a conductive rear portion, to which the free front end section of the shielding braid is connected electrically, characterized in that the method consists, successively, of:

connecting the free front ends of the conductors to the connector;

folding back a front portion of the shielding braid;

moulding a first material at least around the conductors, in a region not surrounded by the folded-back shielding braid;

unfolding the front portion of the shielding braid over this region to bring a front section of the shielding braid into electrical contact with the conductive rear portion of the connector;

clamping the front section of the shielding braid radially around the conductive rear portion of the connector;

moulding a second material to constitute an outer envelope of the assembly that surrounds at least the shielding braid from its free front end to a front portion of the outer sheath of the multicore cable surrounding the shielding braid.

According to other features of the method:

the first material is moulded by injection moulding;

the injection moulding of the first material is carried out in a first mould cavity;

the second material is moulded by injection moulding;

the injection moulding of the second material is carried out in a second mould cavity;

the second cavity is a shaping cavity which gives the assembly a final relative orientation, rectilinear or angled, of the axis of the connector relative to the general axis of the front portion of the multicore cable connected to the connector;

the injection moulding is low-pressure or high-pressure moulding;

a radial clamping device is used for clamping the front section of the shielding braid radially around the conductive rear portion of the connector;

the conductive rear portion of the connector is an externally threaded portion, and the method comprises a step consisting of screwing, onto the conductive rear portion of the connector, a conductive intermediate jointing ring, around which the front section of the shielding braid is clamped radially;

the first material is moulded inside the conductive intermediate jointing ring;

the first and/or the second moulding material is an insulating or conductive material.

The invention also proposes an assembly comprising:

a multicore cable comprising conductors, including at least one electrical conductor, a peripheral metallic shielding braid that surrounds the conductors, and an outer protective sheath; and a connector, to which the front ends of the conductors of the multicore cable are connected, and which comprises a conductive rear portion, to which the free front end section of the shielding braid is connected electrically, characterized in that:

a front section of the conductors adjacent to the connector is surrounded by a first moulded material;

the front portion of the shielding braid adjacent to the connector extends around the front section of the conductors surrounded by the first moulded material;

the front section of the shielding braid is clamped radially around the conductive rear portion of the connector by a clamping element;

at least the shielding braid, from its free front end to a front portion of the outer sheath of the multicore cable, is surrounded by an outer envelope moulded from a second material.

According to other features of the assembly:

the clamping element is a clamping collar;

the conductive rear portion of the connector is an externally threaded portion, onto which a conductive intermediate jointing ring is screwed, around which the front section of the shielding braid is clamped radially;

the first moulded material extends inside the conductive intermediate jointing ring.

BRIEF DESCRIPTION OF THE FIGURES

Other features and advantages of the invention will become clearer on reading the detailed description given hereunder, for understanding of which reference will be made to the appended drawings, where.

DETAILED DESCRIPTION OF THE FIGURES

In the rest of the description, elements having an identical structure or similar functions will be denoted by the same references.

In the rest of the description, axial or longitudinal orientations will be adopted in a non-limiting manner with reference to the general axial direction of the multicore cable and its associated connector, and radial or transverse orientations relative to this longitudinal/axial direction.

An axial orientation is also defined from back to front, from right to left correspondingly with reference to FIGS. 1 to 6.

Figure 1:
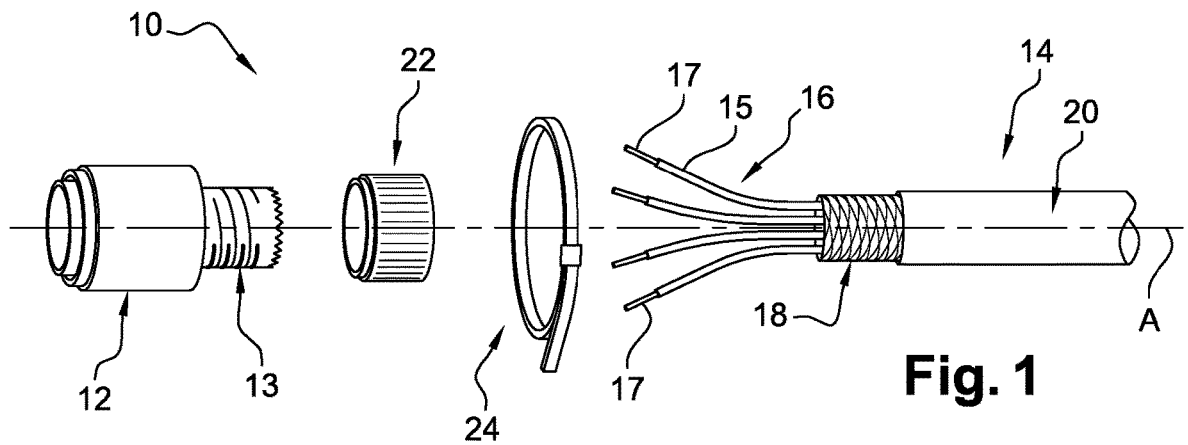
FIG. 1 is a schematic perspective view of the main components of an assembly according to the invention, prior to assembly thereof and before the moulding operations.
Figure 5:
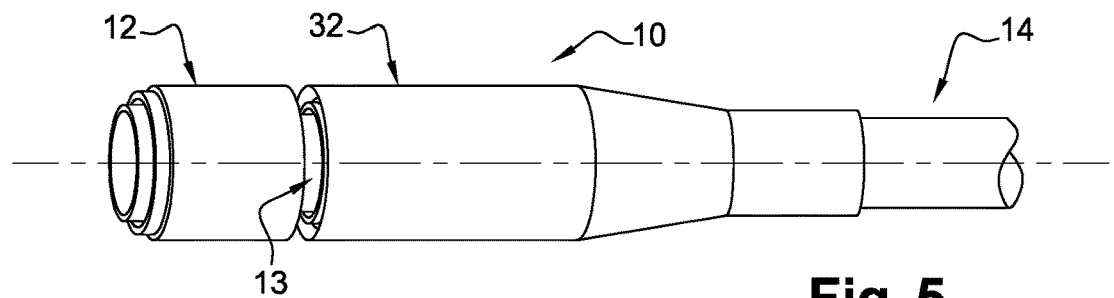
Figure 6:
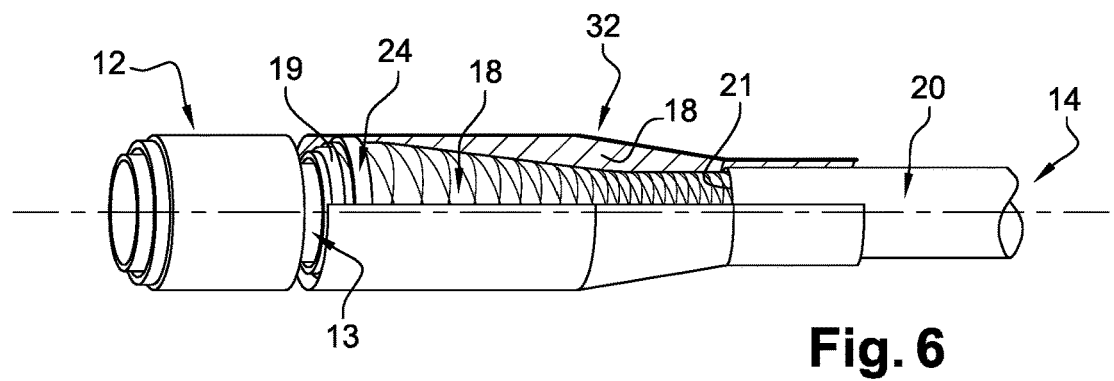
FIG. 6 is a view similar to that in FIG. 5, which illustrates an assembly according to the invention in perspective, with partial stripping of the outer envelope.

FIG. 5 shows an assembled cable 10, the components of which are shown in detail in FIG. 1.

The assembled cable 10 comprises a connector 12, which in this case is an electrical connector, and a multicore cable 14, which in this case is an electric cable.

The multicore cable 14 comprises a plurality of electrical conductors 16, each with its own insulating outer sheath 15, and which are surrounded by a peripheral metallic shielding braid 18, which is electrically conductive.

On its whole length, the multicore cable 14 is surrounded by an outer protective sheath 20, which is a sheath made of impervious plastic.

As can be seen, notably in FIG. 1, with a view to jointing with the connector 12, the front portion of the multicore cable 14 was prepared by removing a free front end portion of the outer protective sheath 20 and a free front end portion of the peripheral metallic braid 18.

Each conductor 16 comprises a free front end 17—shown schematically in FIG. 1—which is configured to allow jointing thereof with the complementary rear portion of the connector 12, for example by axial insertion of this front end 17 into a complementary socket (not shown) opening into the rear face of the connector 12.

For example, the ends 17 of the electrical conductors 16 may be equipped with crimped contacts, which are then plugged into the connector 12.

The principles of the invention are independent of the technique for jointing the electrical and optical conductors to the connector.

The rear portion 13 of the connector 12 is an electrically conductive portion, which is configured here as a cylindrical socket.

In a "MIL" standard or standardized connector of this type, the rear portion 13 of the connector 12 is threaded externally to receive a screwed joint of the type mentioned at the beginning, which can notably provide earthing between the metallic shielding braid 18, and thus electrical continuity of earthing with another assembled cable or electrical and/or electronic equipment.

The components illustrated in FIG. 1 further comprise an intermediate ring 22 and a radial clamping collar 24.

The intermediate ring 22 is a metallic and/or electrically conductive ring, which is threaded internally so that it can be screwed onto the threaded rear portion 13 of the connector 12.

To make it easier to screw on, the periphery of the intermediate ring 12 is knurled.

The clamping collar 24 is of known general design and it may be metallic or insulating.

Figure 2:
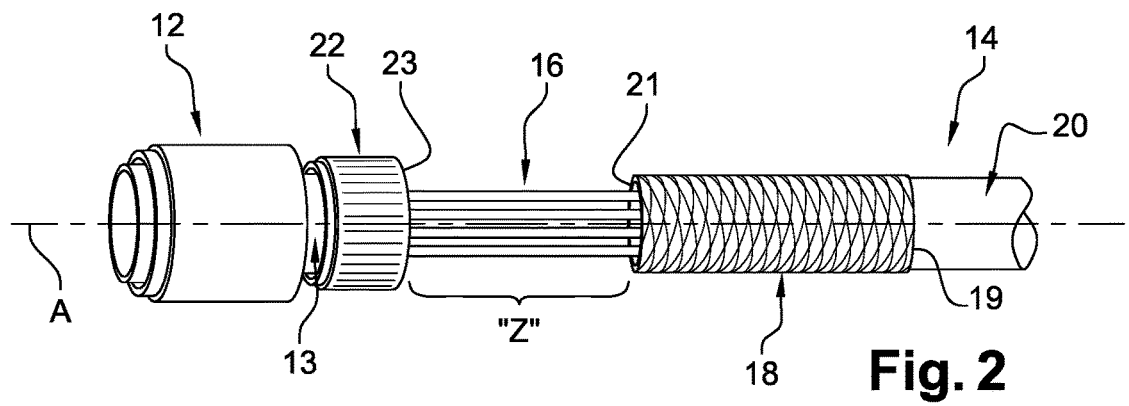
FIGS. 2 to 5 are schematic perspective views illustrating certain steps of the method according to the invention.

The first step of manufacture of the assembled cable 10 illustrated in FIG. 5 comprises, as illustrated in FIG. 2, the operations consisting of:

screwing the intermediate ring 22 onto the threaded rear portion 13 of the connector 12;

folding or pulling back the front portion of the shielding braid 18, which then extends along and over the portion facing the outer sheath 20;

jointing the front free ends 17 of the conductors 16 to the rear face of the connector 12.

The order of the above operations is not limiting.

In the situation illustrated in FIG. 2, there is a region "Z" in which the conductors 16 are free and visible, said region Z extending axially, along the longitudinal axis "A" of the connector 12, between the front end edge 21 of the outer sheath 20 over which the shielding braid 18 is folded, and the rear end edge 23 of the intermediate ring 22.

Starting from the situation illustrated in FIG. 2, the method of manufacture then consists of moulding a first material 26, which is for example a plastic, around the conductors 16.

The moulding operation is for example carried out in a first cavity of a mould (not shown), for example according to a moulding technique such as injection moulding.

Thus, a first overmoulding 28 is produced, of cylindrical general shape, which extends axially between the front end edge 21 of the outer sheath 20 over which the shielding braid 18 is folded, and the rear end edge 23 of the intermediate ring 22, moreover the first material 26 may extend axially forwards into the intermediate ring 22, as far as the rear face of the connector 12.

The first material 26 may also extend between the conductors 16 in such a way that the first overmoulding is "full".

The first moulding may be "low-pressure" moulding, notably when we wish to avoid damaging the conductors 16 and the jointing of their free ends 17 to the connector 12.

Figure 3:
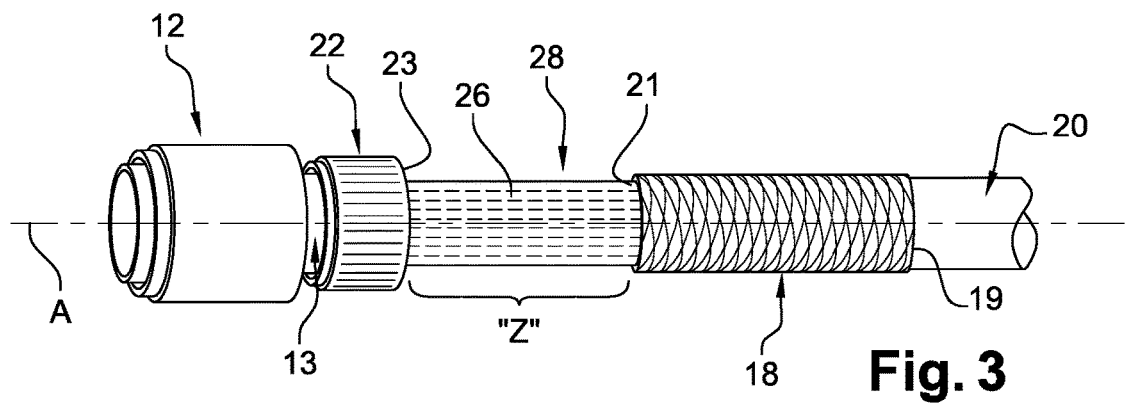

Starting from the situation illustrated in FIG. 3, the method of manufacture then consists of unfolding or pulling forwards the front portion of the shielding braid 18 that was previously folded back, over the portion facing the outer sheath 20.

Thus, the free front end section 19 of the shielding braid 18 extends at least partly over the knurled outside surface of the intermediate ring 22.

As a result, electrical continuity has been established between the shielding braid 18 and the intermediate ring 22, and therefore between the shielding braid 18 and the connector 12.

The free front end section 19 of the shielding braid 18 is clamped radially around the intermediate ring 22 by means of the clamping collar 24, illustrated in its free, unclamped state in FIG. 1.

The clamping collar 24 is an element providing radial clamping, which on the one hand guarantees high quality of electrical contact between the shielding braid 18 and the intermediate ring 22 and which, on the other hand, contributes to good mechanical holding of the shielding braid 18 in position before the next step.

Figure 4:
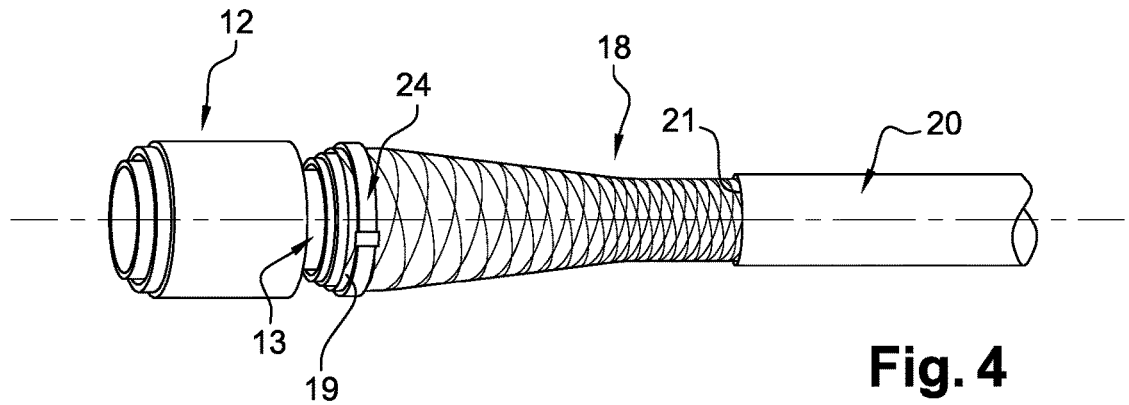

Starting from the situation illustrated in FIG. 4, the method of manufacture then consists of making an outer envelope 32 by moulding a second material 30, which is for example a plastic.

The moulding operation is for example carried out in a second cavity of a mould (not shown), for example according to a moulding technique such as injection moulding.

A second overmoulding 32 is thus produced, of cylindrical general shape.

This second overmoulding forms an outer envelope 32, which extends axially backwards, to cover the front portion of the outer protective sheath 20 delimited by the front end edge 21.

Thus, the rear portion of the overmoulding 32 covers a free front end section of the outer sheath 20, with which it interacts imperviously.

At the front, notably to provide protection and hermeticity, the second overmoulding forming the outer envelope 32 extends axially so as to surround the shielding braid 18 completely.

Thus, the shielding braid 18 is surrounded and covered by the second moulding material 30 on its entire axial length between its front free end edge and the front end edge 21 of the outer sheath 20.

The second moulding material 30 covers and takes on the shape of the metallic shielding braid.

It may also extend axially forwards over the whole of the intermediate ring as far as the rear face of the connector 12.

The second moulding, made around the first moulding 28, interposing the shielding braid 18, may be a "high-pressure" moulding, notably to endow the outer envelope 32 with great rigidity and accuracy of form(s) and dimension(s).

Provided a first moulding 28 has already been carried out, application of a "high-pressure" moulding technique does not present a risk of deterioration of the conductors 16 and of their joints.

In the embodiment example illustrated in FIGS. 1 to 6, the second mould cavity is a shaping cavity, which endows the assembly with an overall rectilinear configuration and a rectilinear final relative orientation of the connector 12 relative to the general axis of the front portion of the multicore cable 14 that is joined to the connector 12.

Figures 7, 8:
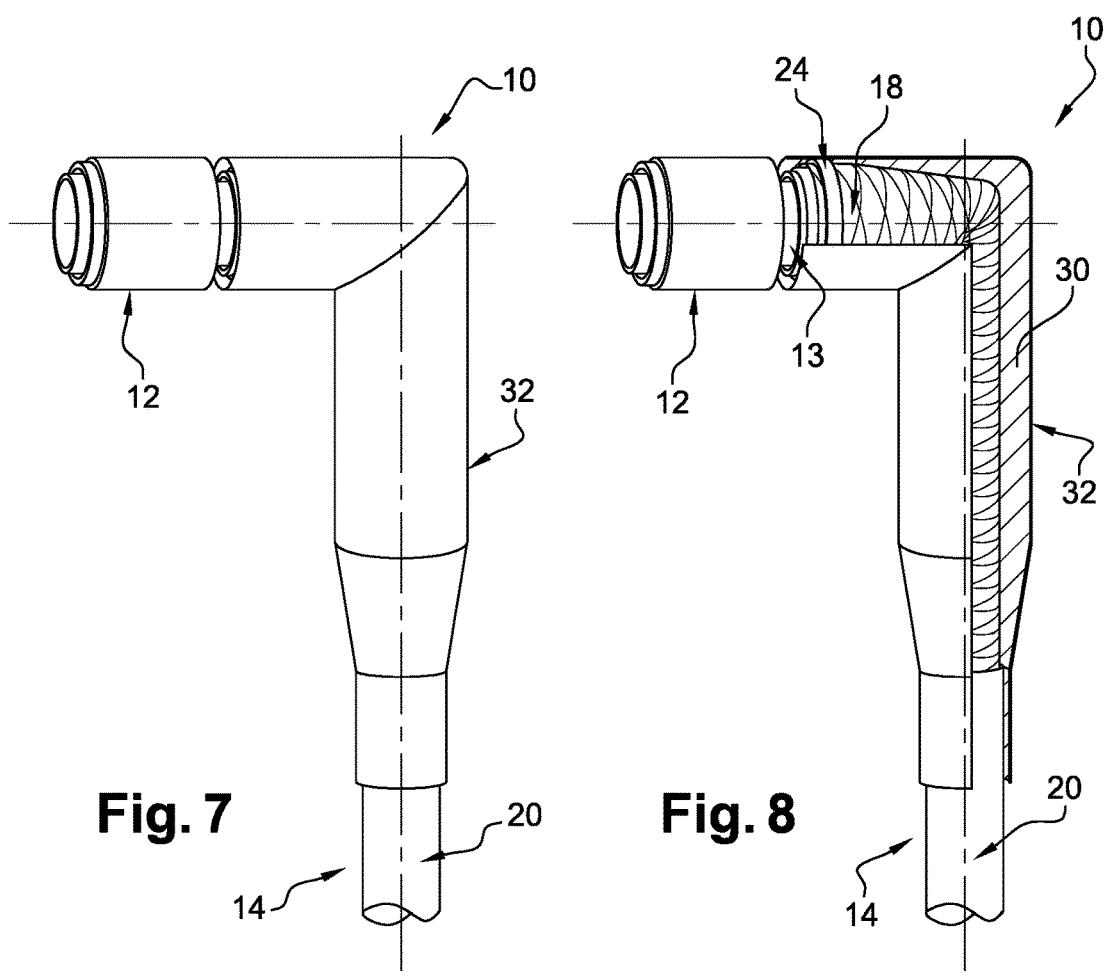
FIGS. 7 and 8 are views similar to those in FIGS. 5 and 6, which illustrate an assembly of the "angled" type.

The second embodiment example illustrated in FIGS. 7 and 8 only differs from the first example by the "angled" configuration—in this case at an angle of 90 degrees—of the front portion of the multicore cable 14 that is joined to the connector 12.

By selecting the profile of the mould cavities used for the various moulding operations, the method according to the invention makes it possible to produce all possible orientations as well as all shapes and external profiles of the outer envelope 32.

According to the embodiment described above, the clamping collar 24 is the device that provides radial clamping of the braid that guarantees the quality of electrical contact and that contributes to good mechanical durability of the shielding braid.

The invention is not limited to a clamping collar. According to variants that are not shown, it is for example possible to use a clamping spring with constant clamping, a shape-memory clamping ring, a so-called "self-amalgamating" clamping sleeve, etc.

The invention claimed is:

1. A method for manufacturing an assembly consisting of a connector and a multicore cable that comprises:

a multicore cable comprising conductors including at least one electrical conductor, a peripheral metallic shielding braid that surrounds the conductors, and an outer protective sheath;

a connector to which the front ends of the conductors of the multicore cable are connected, the connector comprising a conductive rear portion to which the free front end section of the shielding braid is connected electrically, wherein the method comprises:

jointing the front free ends of the conductors to the connector;

folding back a front portion of the shielding braid;

moulding a first material at least around the conductors, in a region not surrounded by the folded-back shielding braid;

unfolding said front portion of the shielding braid over said region to bring a front section of the shielding braid into electrical contact with the conductive rear portion of the connector;

clamping the front section of the shielding braid radially around the conductive rear portion of the connector;

moulding a second material to constitute an outer envelope of the assembly that surrounds at least the shielding braid from its front free end to a front portion of the outer sheath of the multicore cable surrounding the shielding braid.

2. The method according to claim 1, wherein the first material is moulded by injection moulding.

3. The method according to claim 2, wherein the injection moulding of the first material is carried out in a first mould cavity.

4. The method according to claim 1, wherein the second material is moulded by injection moulding.

5. The method according to claim 4, wherein the injection moulding of the second material is carried out in a second mould cavity.

6. The method according to claim 5, wherein the second mould is a shaping mould that gives the assembly a final relative orientation, rectilinear or angled, of the axis of the connector relative to the general axis of the front portion of the multicore cable joined to the connector.

7. The method according to claim 2, wherein the injection moulding is low-pressure or high-pressure moulding.

8. The method according to claim 1, wherein a radial clamping device is used for clamping the front section of the shielding braid radially around the conductive rear portion of the connector.

9. The method according to claim 1, wherein the conductive rear portion of the connector is an externally threaded portion, and in that the method comprises a step consisting of screwing a conductive intermediate jointing ring onto the conductive rear portion of the connector around which said front section of the shielding braid is clamped radially.

10. The method according to claim 9, wherein the first material is moulded inside the conductive intermediate jointing ring.

11. The method according to claim 1, wherein the first and/or second moulding material is an insulating material or a conductive material.

12. An assembly comprising:

a multicore cable comprising conductors including at least one electrical conductor, a peripheral metallic shielding braid that surrounds the conductors, and an outer protective sheath; and a connector, to which the front ends of the conductors of the multicore cable are joined, and which comprises a conductive rear portion, to which the free front end section of the shielding braid is connected electrically, wherein:

a front section of the conductors, adjacent to the connector, is surrounded by a first moulded material;

the front portion of the shielding braid adjacent to the connector extends around said front section of the conductors surrounded by the first moulded material;

the front section of the shielding braid is clamped radially around the conductive rear portion of the connector by a clamping element;

at least the shielding braid from its front free end to a front portion of the outer sheath of the multicore cable is surrounded by an outer envelope moulded from a second material.

13. The assembly according to claim 12, wherein the clamping element is a clamping collar.

14. The assembly according to claim 12, wherein the conductive rear portion of the connector is an externally threaded portion on which a conductive intermediate jointing ring is screwed, around which said front section of the shielding braid is clamped radially.

15. The assembly according to claim 14, wherein the first moulded material extends inside the conductive intermediate jointing ring.

* * * * *